(12) United States Patent
Ibrahim et al.

(10) Patent No.: US 9,998,010 B1
(45) Date of Patent: Jun. 12, 2018

(54) AUTOMATICALLY RECONFIGURABLE BUCK-BOOST DC-DC CONVERTER WITH SHARED CAPACITORS

(71) Applicant: Vidatronic Inc., College Station, TX (US)

(72) Inventors: Sameh Ahmed Assem Ibrahim, Cairo (EG); Faisal Abdellatif Elseddeek Hussien, Cairo (EG); Mohamed Mostafa Saber Aboudina, Giza (EG); Moises Emanuel Robinson, College Station, TX (US)

(73) Assignee: Vidatronic Inc., College Station, TX (US)

( * ) Notice: Subject to any disclaimer, the term of this patent is extended or adjusted under 35 U.S.C. 154(b) by 0 days. days.

(21) Appl. No.: 15/477,104

(22) Filed: Apr. 2, 2017

(51) Int. Cl.
| | |
|---|---|
| *H02M 3/158* | (2006.01) |
| *G05F 1/59* | (2006.01) |
| *H02M 3/06* | (2006.01) |
| *H02M 3/337* | (2006.01) |
| *H02M 1/00* | (2006.01) |
| *H02M 1/42* | (2007.01) |

(52) U.S. Cl.
CPC .......... *H02M 3/1582* (2013.01); *H02M 3/06* (2013.01); *H02M 3/1584* (2013.01); *H02M 3/337* (2013.01); *H02M 2001/0016* (2013.01); *H02M 2001/4291* (2013.01)

(58) Field of Classification Search
CPC ....... H02M 2001/0045; H02M 3/1582; H02M 2003/072; H02M 3/158; H02M 3/07; G05F 1/59; G05F 1/613
See application file for complete search history.

(56) References Cited

U.S. PATENT DOCUMENTS

| | | | |
|---|---|---|---|
| 6,262,567 B1 * | 7/2001 | Bartlett .................. | G05F 1/465 323/266 |
| 2006/0082351 A1 * | 4/2006 | Martins .................. | H02J 9/005 323/268 |

* cited by examiner

*Primary Examiner* — Gary L Laxton
(74) *Attorney, Agent, or Firm* — Liang Legal Group, PLLC

(57) ABSTRACT

An automatically reconfigurable Buck-Boost DC-DC converter having an input supply and an output voltage includes a linear regulator (LDO) for Buck configuration; a switched-capacitor DC-DC converter; a capacitor and switch array, and a gain selector to switch between the linear regulator (LDO) when an output DC level is higher than an input DC level (Buck configuration) and the switched-capacitor DC-DC converter when the output DC level is lower than the input DC level (Boost configuration).

10 Claims, 6 Drawing Sheets

AUTOMATICALLY RECONFIGURABLE
BUCK-BOOST DC-DC CONVERTER WITH
SHARED CAPACITORS

FIELD OF THE INVENTION

This invention relates to a DC-DC converter, particularly to a Buck-Boost DC-DC converter.

BACKGROUND

A DC-DC converter is a circuit that converts an unregulated DC supply into a well-regulated one. The converter can be a linear regulator or a switching one. Linear regulators produce a ripple-free output voltage, but a DC-DC linear regulator can be used only when the output DC level is lower than the input level (e.g. this is known as a Buck operation). They also suffer from poor power efficiency when the difference between the input DC level and the output DC level is large.

Switching regulators, on the other hand, can be used when the output DC level is higher, lower or equal to the input DC level. Switching regulators provide better power efficiencies, but they suffer from output voltage ripples. Switching regulators can use inductors or capacitors as their energy-storage elements. Switched-capacitor DC-DC converters are gaining importance recently because they can provide a fully-integrated solution, as compared to switched-inductor ones.

FIG. 1 shows a prior art fully integrated switched-capacitor DC-DC converter. The conversion ratio (the quotient of the output DC level over the input DC level) of a switched-capacitor DC-DC converter is determined by the capacitor array topology. To regulate the output DC voltage at a different level, the equivalent output resistance of the converter should be changed, resulting in a degraded power efficiency. The switched-capacitor DC-DC converter in FIG. 1 may use a multiple-capacitor-array topology to produce multiple conversion ratios in order to avoid this tradeoff.

The switched-capacitor DC-DC converter in FIG. 1, for example, may comprise a capacitor and switch array (101), which includes multiple capacitors. Such a capacitor and switch array (101) can achieve different configurations and conversion ratios. A gain selector (102) is responsible for selecting the appropriate conversion ratio based on the input DC level and the desired output DC level. A clock generator (103) is responsible for generating the required clock phases for the converter, and a feedback controller and voltage-controlled oscillator (VCO) (104) is responsible for regulating the output DC level based on the output load within a selected conversion ratio. The number of conversion ratios achievable are determined by the number of capacitors and switches in the array, this leads to an optimized power efficiency.

However, the overhead of array re-configuration on converter complexity and power consumption can be high and unnecessary for certain ranges of input and output DC levels. The output ripples in capacitor-limited converters can also be prohibitively large. Capacitor-limited converters also suffer from area constraints when capacitor stacking is needed for input and/or output DC levels larger than the capacitors reliability voltage rating.

Thus, while the prior art switching regulators have been useful, there is still a need for capacitor-limited converters for high input and/or output DC level ranges.

SUMMARY

In general, in one aspect, the invention relates to a novel Buck-Boost DC-DC converter architecture that enhances the performance of a Boost switched capacitor DC-DC converter by combining it with a linear regulator, where both blocks share the same capacitor array and feedback loop in order to minimize silicon area and to improve performance.

One aspect of the invention relates to automatically reconfigurable Buck-Boost DC-DC converters having an input supply and an output voltage. An automatically reconfigurable Buck-Boost DC-DC converter in accordance with one embodiment of the invention includes a linear regulator (LDO) for Buck configuration; a switched-capacitor DC-DC converter; a capacitor and switch array, and a gain selector to switch between the linear regulator (LDO) when an output DC level is higher than an input DC level (Buck configuration) and the switched-capacitor DC-DC converter when the output DC level is lower than the input DC level (Boost configuration). The capacitor and switch array may be implemented on chip or off chip.

In accordance with embodiments of the invention, the capacitor and switched array comprises capacitors configured to work as load capacitors for the LDO when in Buck configuration and as flying capacitors for the switched-capacitor DC-DC converter when in Boost configuration, based on decision made by the gain selector.

In accordance with embodiments of the invention, a Buck-Boost DC-DC converter further comprise a switched-capacitor clock generator and a feedback controller and a voltage-controlled oscillator (VCO).

In accordance with embodiments of the invention, the capacitor and switch array comprises capacitors selected from the group consisting of a metal-oxide semiconductor (MOS) capacitor, a metal-oxide-metal (MOM) capacitor, a metal-insulator-metal (MIM) capacitor, and a combination thereof.

In accordance with embodiments of the invention, the switch and switch array comprises switches that are implemented with one or more selected from the group consisting of an n-type MOS transistor (NMOS), a p-type MOS transistor (PMOS), an NPN-type transistor (NPN), a PNP-type transistor (PNP), a transmission gate, and a combination thereof.

In accordance with embodiments of the invention, the switched-capacitor clock generator and the VCO are enabled when the output DC level is higher than that of the input DC level and when the input DC level is lower than a voltage rating of a capacitor in the switched-capacitor DC-DC converter.

In accordance with embodiments of the invention, the switched-capacitor clock generator is used to generate required clock phases for the capacitor and switch array to be used as the switched-capacitor DC-DC converter.

In accordance with embodiments of the invention, the feedback controller and VCO are enabled to set a frequency of the SC clock generator when the capacitor and switch array is used as the switched capacitor DC-DC converter to set an output DC level at a required value. The feedback controller is used in a regulation loop when the LDO is enabled. The capacitor and switch array is configured as capacitors in parallel to an output load when the LDO is enabled.

Other aspects of the invention will be apparent from the following detailed description and the appended claims.

BRIEF DESCRIPTION OF DRAWINGS

The appended drawings illustrate several embodiments of the invention and are not to be considered limiting of its scope, for the invention may admit to other equally effective embodiments.

DETAILED DESCRIPTION

Figure 1:
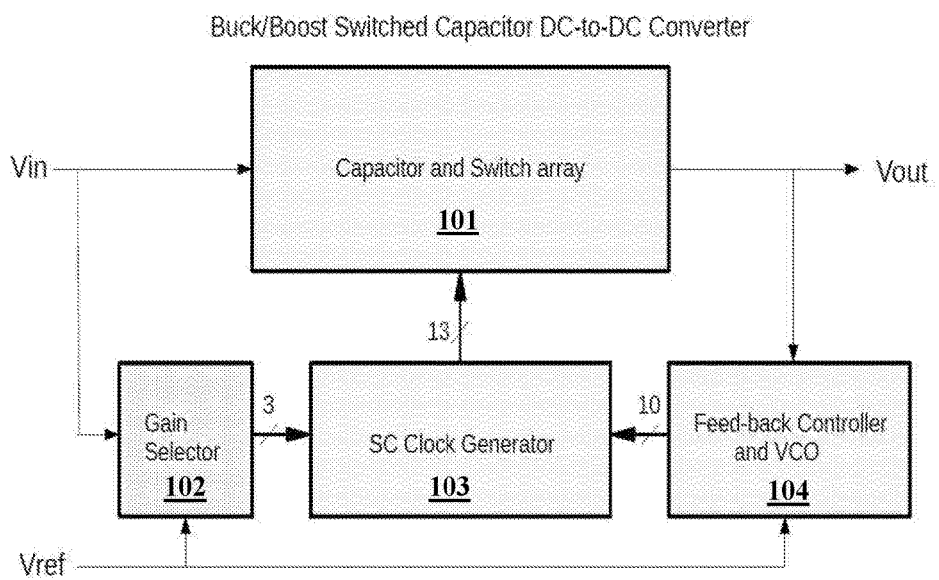
FIG. 1 shows schematic block level circuit diagram of a prior art reconfigurable switched-capacitor DC-DC converter.

Aspects of the present disclosure are shown in the above-identified drawings and are described below. In the description, like or identical reference numerals are used to identify common or similar elements. The drawings are not necessarily to scale and certain features may be shown exaggerated in scale or in schematic in the interest of clarity and conciseness.

Embodiments of the invention relate to an automatically reconfigurable Buck-Boost DC-DC converter comprising a Boost switched-capacitor DC-DC converter merged with a low-dropout regulator (LDO), with both blocks sharing the same capacitor array and feedback loop. In accordance with embodiments of the invention, the capacitor array may be used as flying capacitors for the switched capacitor DC-DC converter or as an output capacitor for the linear regulator. In accordance with embodiments of the invention, the gain selector may automatically switch to the switched-capacitor DC-DC converter or the linear regulator configuration based on the input and output DC levels. Without this invention, a separate switched-capacitor DC-DC converter can be used with stacked capacitors and degraded efficiency for capacitor-limited implementation and high range of input DC level. Those skilled in the art, with the benefit of this disclosure, will appreciate that same or similar features are equally applicable to any system, the input DC level range of which is higher than the voltage rating of the used capacitors.

In accordance with embodiments of the invention, the shared capacitor array may be implemented on a microchip, such as a semiconductor integrated circuit, or can be implemented using devices external to a microchip. In accordance with embodiments of the invention, the output DC level can be fixed or variable, but with a maximum value lower than the voltage rating of the capacitors used. Throughout this disclosure, the terms "DC-DC converter," "voltage regulator," and "regulator" may be used interchangeably depending on the context. The terms "linear regulator," "low-dropout regulator," and "LDO" may also be used interchangeably depending on the context.

Figure 2:
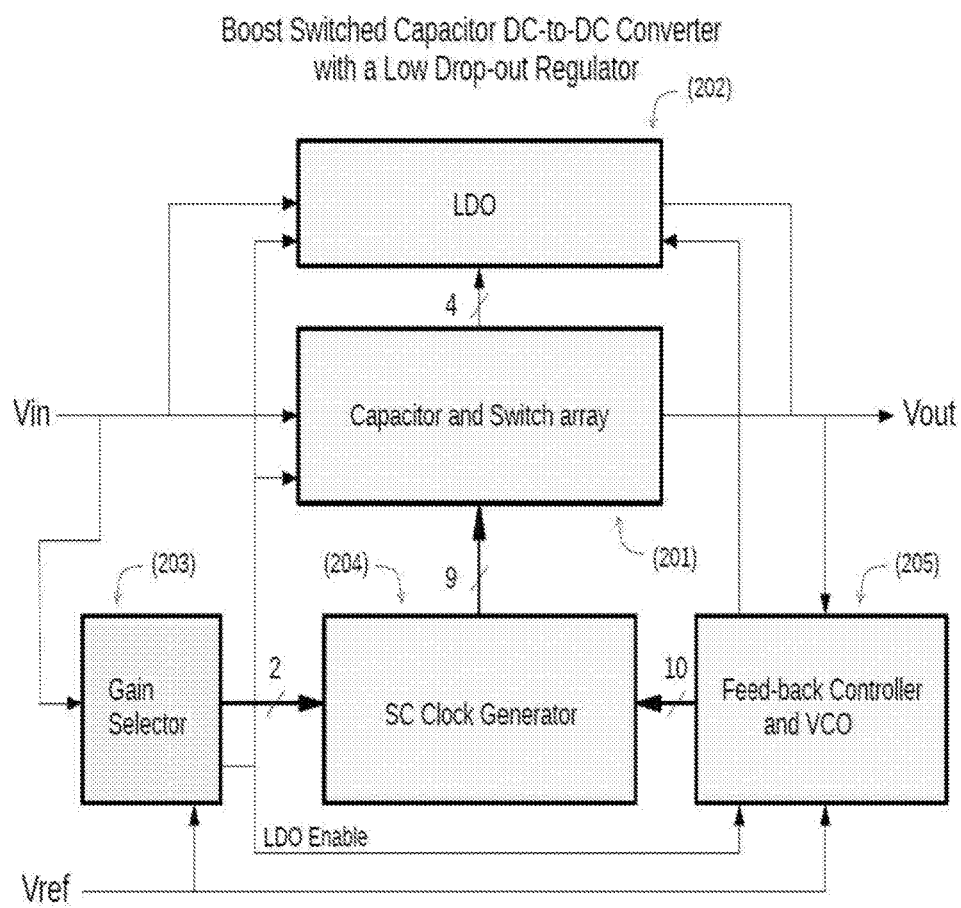
FIG. 2 shows a schematic block level circuit diagram of an automatically reconfigurable Buck-Boost DC-DC converter with shared capacitor array in accordance with one embodiment of the invention.

FIG. 2 shows an example of a schematic block-level diagram of an automatically reconfigurable Buck-Boost DC-DC converter with a shared capacitor array in accordance with one embodiment of the invention. The regulator (i.e., Buck-Boost DC-DC converter) comprises a switched-capacitor array (i.e., a capacitor and switch array) (201) that can be reconfigured to achieve different conversion ratios and is used when the output DC level is higher than the input DC level (e.g., Boost operation). The regulator also comprises an LDO (202) that can be used when the desired output DC level is lower than that of the input (e.g., Buck operation) and a gain selector (203) responsible for automatically changing the conversion ratio and activating either the switched-capacitor converter or the LDO based on the input and output DC levels. The regulator further comprises a clock generator (204) that generates the necessary clock phases for the switched-capacitor converter (201) and a feedback controller and voltage-controlled oscillator (VCO) (205) used for regulating the output DC level against load variations.

Figure 3:
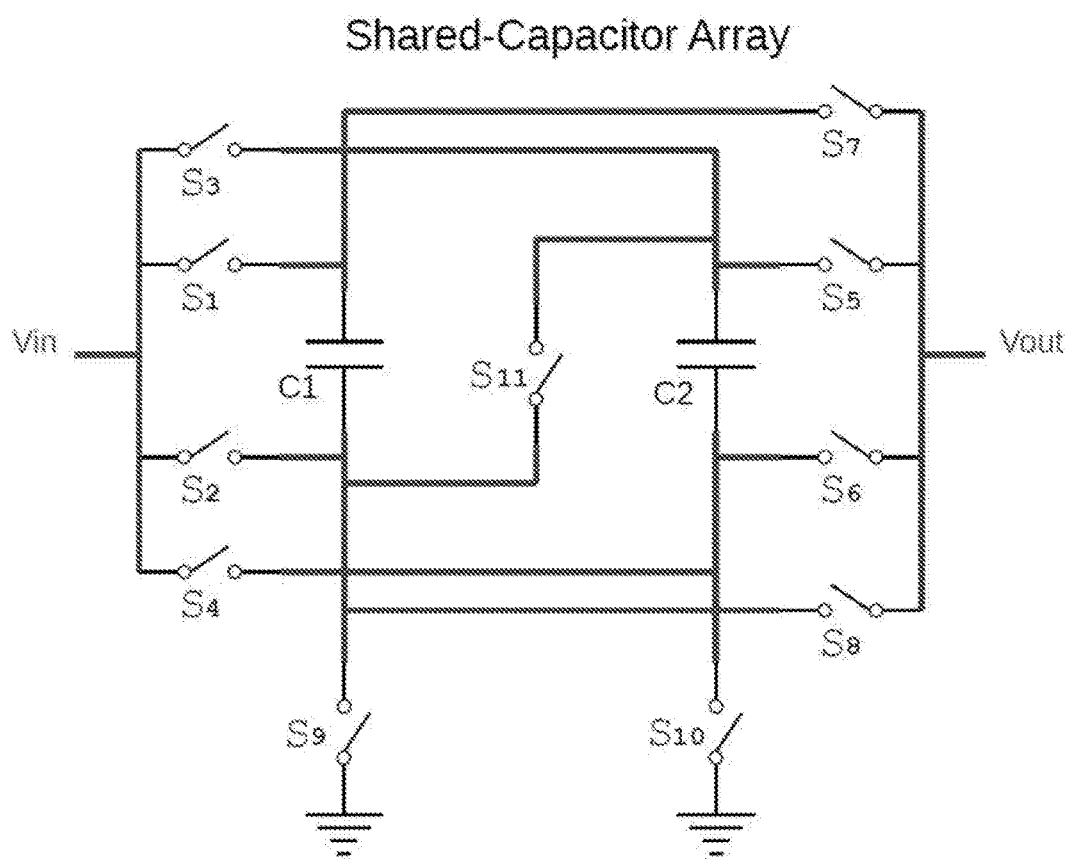
FIG. 3 shows a possible implementation for a shared capacitor array to be used by the automatically reconfigurable Buck-Boost DC-DC converter of FIG. 2 in accordance with one embodiment of the invention.

FIG. 3 shows an example of a possible implementation of a shared capacitor array for use in the regulator of FIG. 2. This exemplary implementation consists of two capacitors (C1 and C2) and eleven switches (S1-S11). The capacitors can be off-chip capacitors or implemented on-chip with any type of capacitors, such as metal-oxide semiconductor (MOS) capacitors, metal-oxide-metal (MOM) capacitors, or metal-insulator-metal (MIM) capacitors, etc. The switches can be implemented as p-type MOS transistors, n-type MOS transistors, and/or transmission gates. By turning on and off the switches the array can be configured to achieve different configuration ratios when used as a switched-capacitor DC-DC converter or they can be used as a load capacitor for the LDO. One skilled in the art would appreciate that the particular example in FIG. 3 is for illustration only and that other variations and modifications are possible without departing from the scope of the invention. For example, the capacitor array may have more or fewer capacitors and/or switches.

Figure 4:
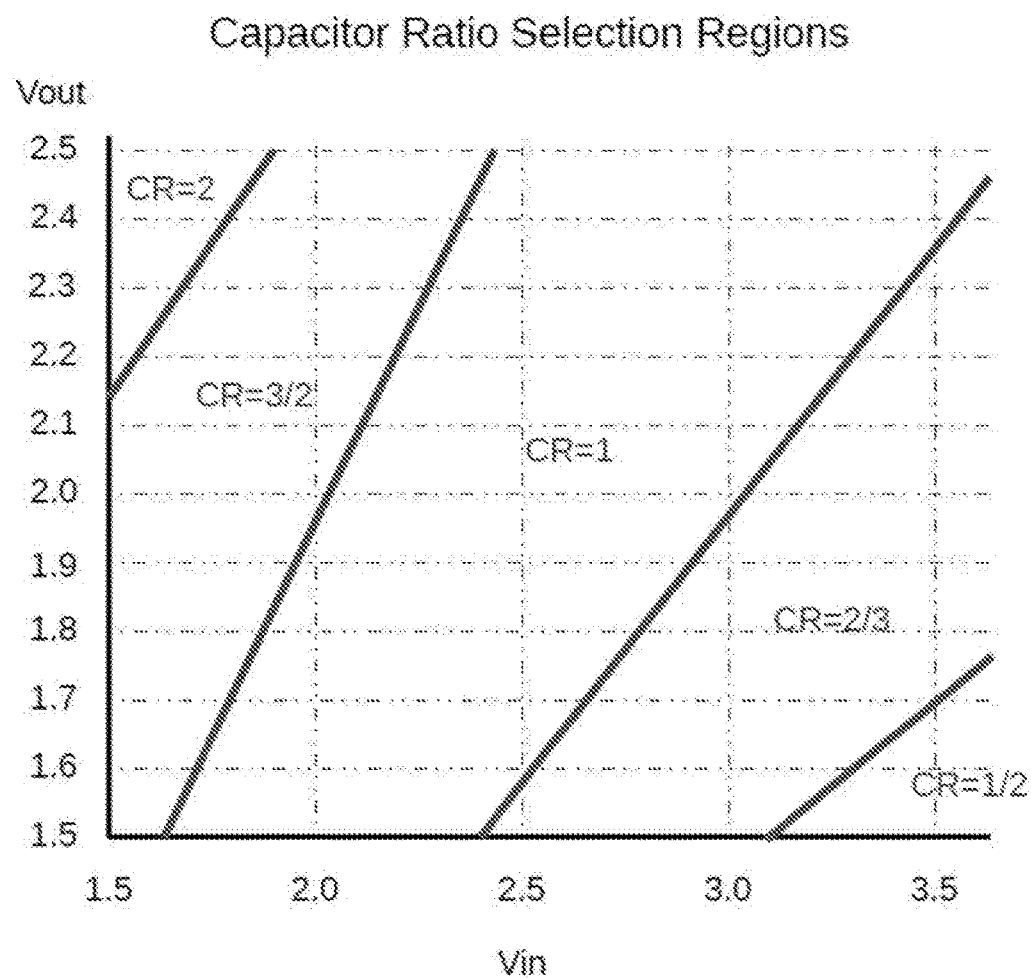
FIG. 4 shows a possible selection map for conversion ratios of an automatically reconfigurable Buck-Boost DC-DC converter in accordance with embodiments of the invention.

FIG. 4 shows a possible map for selecting the different configuration ratios when the input DC level ranges between 1.5 and 3.6 V and the output DC level ranges between 1.5 and 2.5 V. The gain selector (203 in FIG. 2) may be used for selecting an appropriate conversion ratio based on the comparison between the input and output DC levels. The VCO and feedback controller (205 in FIG. 2) then performs the load regulation to adjust the output at the required DC level. In this example, five different conversion ratios are used in the switched capacitor DC-DC converter. One skilled in the art would appreciate that this is for illustration only and that other conversion ratios are possible with different implementations of switched-capacitor arrays. Some of these conversion ratios are for a Buck configuration (e.g., output DC level is lower than the input DC level) and others are for a Boost configuration (e.g., output DC level is higher than the input DC level).

As noted above, if the input or output levels are higher than the maximum voltage rating for the capacitors, the capacitors may be damaged due to exposure to high and unsafe voltage levels. A solution may be to stack the capacitors and add voltage-protection circuits to limit the voltage across each stacked capacitor. However, this solution would reduce the effective value of capacitors in a capacitor-limited implementation, resulting in degraded power efficiency. Instead, embodiments of the invention limit the use of the switched-capacitor DC-DC converter to Boost ratios only and replace the Buck ratios with an LDO. Therefore, embodiments of the invention can avoid the above-mentioned problem.

Figure 5:
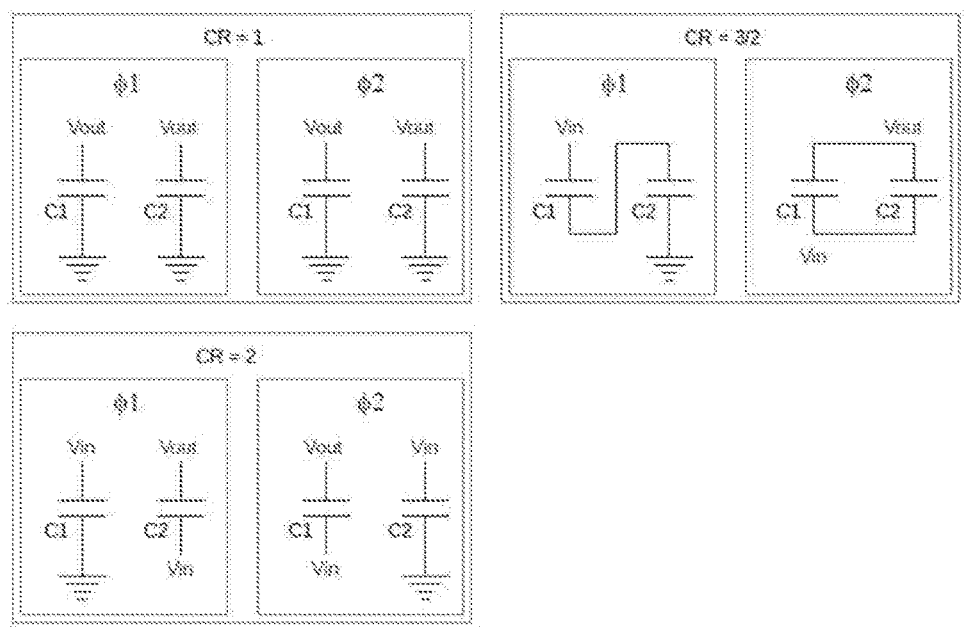
FIG. 5 shows possible configurations for a capacitor array in an automatically reconfigurable Buck-Boost DC-DC converter in accordance with embodiments of the invention.

FIG. 5 shows several different configurations of the capacitor arrays when the switched-capacitor DC-DC converter is limited to Boost conversion ratios only and the LDO is used for the Buck conversion ratio, in accordance with embodiments of the invention. One skilled in the art would appreciate that the limited examples shown in FIG. 5 are fore illustration only and that other modifications and variations are possible without departing from the scope of the invention. The clock generator (204 in FIG. 2) is responsible for generating the required two clock phases Φ1 and Φ2. When used as an LDO, the capacitors are connected to the output to be used for stabilization of the LDO.

Figure 6:
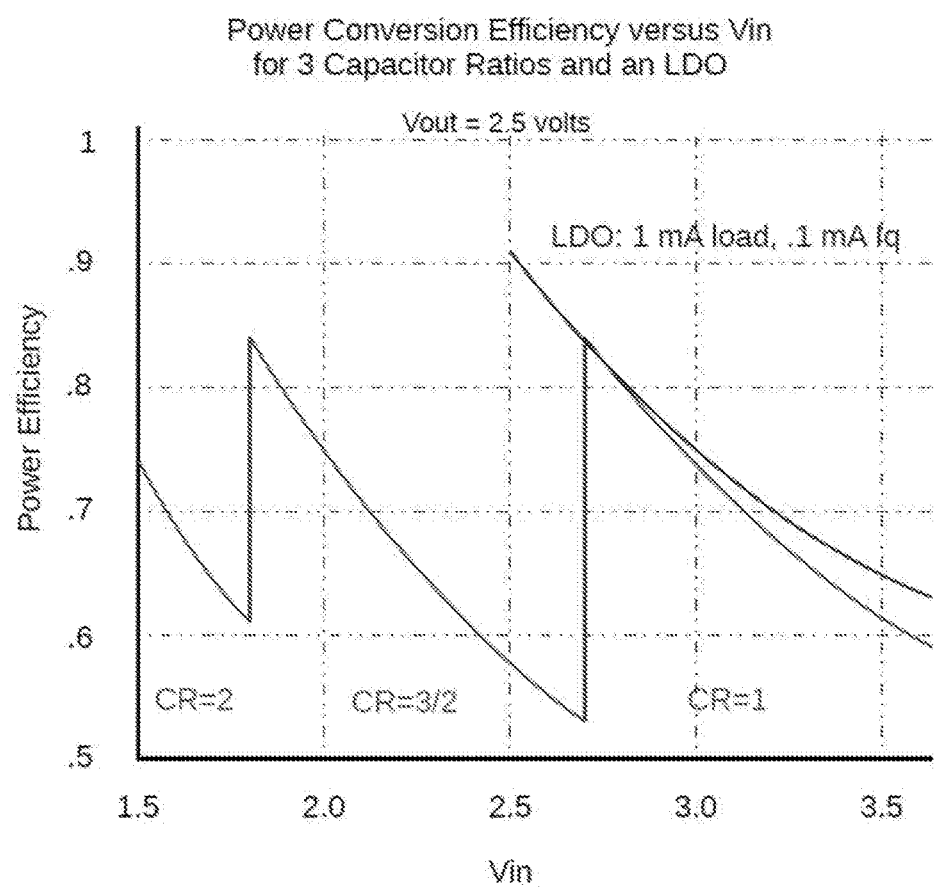
FIG. 6 shows simulated power efficiency curves for an automatically reconfigurable Buck-Boost DC-DC converter in accordance with embodiments of the invention.

FIG. 6 shows simulated Power Efficiency curves for the switched-capacitor DC-DC converter and the LDO. It is clear from the curves that the switched capacitor adds no benefit for a conversion ratio of 1 in terms of power efficiency. Moreover, the LDO allows for a ripple-free output voltage as well as protection of the capacitors from higher input voltage ranges beyond their voltage ratings. Therefore, embodiments of the invention provide better configurations.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An automatically reconfigurable Buck-Boost DC-DC converter having an input supply and an output voltage, comprising:
    a linear regulator (LDO) for Buck configuration;
    a switched-capacitor DC-DC converter;
    a capacitor and switch array, and
    a gain selector to switch between the linear regulator (LDO) when an output DC level is higher than an input DC level (Buck configuration) and the switched-capacitor DC-DC converter when the output DC level is lower than the input DC level (Boost configuration),
    wherein the capacitor and switched array comprises capacitors configured to work as load capacitors for the LDO when in Buck configuration and as flying capacitors for the switched-capacitor DC-DC converter when in Boost configuration, based on decision made by the gain selector.

2. The automatically reconfigurable Buck-Boost DC-DC converter of claim 1, further comprising:
    a switched-capacitor clock generator; and
    a feedback controller and a voltage-controlled oscillator (VCO).

3. The automatically reconfigurable Buck-Boost DC-DC converter of claim 1,
    wherein the capacitor and switch array is implemented on chip or off chip.

4. The automatically reconfigurable DC-DC converter of claim 1,
    wherein the capacitor and switch array comprises one or more capacitors selected from the group consisting of a metal-oxide semiconductor (MOS) capacitor, a metal-oxide-metal (MOM) capacitor, and a metal-insulator-metal (MIM) capacitor.

5. The automatically reconfigurable Buck-Boost DC-DC converter of claim 1,
    wherein the switch and switch array comprises switches that are implemented with one or more selected from the group consisting of an n-type MOS transistor (NMOS), a p-type MOS transistor (PMOS), an NPN-type transistor (NPN), a PNP-type transistor (PNP), and a transmission gate.

6. The automatically reconfigurable Buck-Boost DC-DC converter of claim 2,
    wherein the switched-capacitor clock generator and the VCO are enabled when the output DC level is higher than that of the input DC level and when the input DC level is lower than a voltage rating of a capacitor in the switched-capacitor DC-DC converter.

7. The automatically reconfigurable Buck-Boost DC-DC converter of claim 2,
    wherein the switched-capacitor clock generator is used to generate required clock phases for the capacitor and switch array to be used as the switched-capacitor DC-DC converter.

8. The automatically reconfigurable Buck-Boost DC-DC converter of claim 2,
    wherein the feedback controller and VCO are enabled to set a frequency of the SC clock generator when the capacitor and switch array is used as the switched capacitor DC-DC converter to set an output DC level at a required value.

9. The automatically reconfigurable Buck-Boost DC-DC converter of claim 2,
    wherein the feedback controller is used in a regulation loop when the LDO is enabled.

10. The automatically reconfigurable Buck-Boost DC-DC converter of claim 1,
    wherein the capacitor and switch array is configured as capacitors in parallel to an output load when the LDO is enabled.

* * * * *